United States Patent [19]

Ida

[11] Patent Number: 4,743,119
[45] Date of Patent: May 10, 1988

[54] OPTICAL MEASURING APPARATUS

[75] Inventor: Yoshiaki Ida, Amagasaki, Japan

[73] Assignee: Mitsubishi Denki Kabushiki Kaisha, Tokyo, Japan

[21] Appl. No.: 895,666

[22] Filed: Aug. 11, 1986

[30] Foreign Application Priority Data

Aug. 22, 1985 [JP] Japan ................................ 60-186263
Jan. 24, 1986 [JP] Japan .................................. 61-14072

[51] Int. Cl.$^4$ ..................... G01B 11/00; G01B 11/14; G01D 5/34; H01J 5/16
[52] U.S. Cl. .................................. 356/372; 356/375; 250/231 R; 250/231 P; 250/227
[58] Field of Search ................ 356/372, 375; 250/227, 250/231 R, 231 P; 324/96, 97; 73/705, DIG. 1

[56] References Cited

U.S. PATENT DOCUMENTS 4,281,245  7/1981  Brogardh et al. ................... 250/227
4,560,868 12/1985  Brogardh et al. ................... 250/227
4,644,154  2/1987  Brogardh et al. .......... 250/231 R X

FOREIGN PATENT DOCUMENTS 59-22888  5/1984  Japan .

Primary Examiner—Eugene R. LaRoche
Assistant Examiner—David Mis
Attorney, Agent, or Firm—Burns, Doane, Swecker & Mathis

[57] ABSTRACT

The present invention relates to an optical measuring apparatus for optically measuring physical quantities such as magnetic field, pressure and electric field, which is made from a substance being permeable to a light having a first wave length and shields a light having a second wave length, and in which shielding means changing a ratio of shielding the light having the second wave length in correspondence to a physical quantity to be measured is arranged in a transmission path through which said lights having two kinds of wave length are transmitted, said lights having two kinds of wave length, which passed through or by said shielding means, being received to calculate the ratio of a quantity of the light having the second wave length received to that of the light having the first wave length received, whereby measuring the physical quantity.

17 Claims, 4 Drawing Sheets

OPTICAL MEASURING APPARATUS

BACKGROUND OF THE INVENTION

1. Field of the Invention

The present invention relates to an optical measuring apparatus for optically measuring physical quantities such as magnetic field, pressure and electric field.

2. Description of the Prior Art

Referring now to FIG. 1 which is a block diagram showing, for example, a magnetic-field measuring apparatus for measuring the magnetic field of the conventional optical measuring apparatus, reference number 1 designates a light source, 2 designating a transmission path (hereinafter referred to as an optical fiber) formed of an optical fiber connected with the light source 1 at one end thereof for transmitting a light from the light source 1, 3 designating a self-focusing lens mounted on the other end of the optical fiber 2 for changing beams of light radiated from the optical fiber 2 to parallel beams of light, 4 designating a polarizer for changing the parallel beams of light obtained by the self-focusing lens 3 to a linearly polarized light, and 5 designating a magnetic optical element arranged in a magnetic field to be measured for rotating a plane of polarization of the linearly polarized light from the polarizer 4 in correspondence to the magnetic field to be measured. In addition, 7 designating an analyzer for dividing the optical output from the magnetic optical element 5 into polarized ingredients meeting at right angles to each other, 8a, 8b designating lenses for collecting the lights having been divided by the analyzer 7 and making them incident upon optical fibers 9a, 9b, 10a, 10b designating photo-detectors mounted on one end of the optical fibers 9a, 9b for converting the lights transmitted by the optical fibers 9a, 9b into electric signals i1, i2, 11 designating an adder for adding the electric signals i1, i2 having been converted by the photo-detectors 10a, 10b, 12 designating a subtracter for subtracting the electrical signal i2 from the electric signal i1, and 13 designating a divider for dividing the output from the subtracter 12 by the output from the adder 11.

Next, the operation is described. A light radiated from the light source 1 is transmitted by the optical fiber 2, changed to parallel beams of light by the self-focusing lens 3, and converted into the linearly polarized light by the polarizer 4. This linearly polarized light is incident upon the magnetic optical element 5 to rotate the plane of polarization thereof in correspondence to the magnetic field to be measured. The light, whose plane of polarization is rotated, is divided into two polarized ingredients, $P_p$, $P_s$ meeting at right angles to each other by the analyzer 7 arranged at an angle of 45° to the linearly polarized light of the output from the polarizer 4. The divided lights $P_p$, $P_s$ are collected by the lenses 8a, 8b and incident upon the photo-detectors 10a, 10b through the optical fibers 9a, 9b to be photoelectrically converted, respectively. An optical strength of the divided lights $P_p$, $P_s$ is expressed as follows, respectively:

$$P_p = \tfrac{1}{2} \cdot P_o (1 + \sin 2\theta_F)$$

$$P_s = \tfrac{1}{2} \cdot P_o (1 - \sin 2\theta_F)$$

wherein $\theta_F$ is an angle of rotation of the plane of polarization by the magnetic optical element 5; and $P_o$ is a strength prior to the incidence upon the analyzer 7.

$(P_p - P_s)/(P_p + P_s) = \sin 2\theta_F$ is derived from the above described equations, whereby the angle of rotation of the plane of polarization can be calculated by a simple operation without using the strength of light. In such an operation (i1+i2) is calculated by the adder 11, (i1−i2) being calculated by the subtractor 12, and (i1−i2)/(i1+i2) being calculated by the divider 13 to determine the angle of rotation of the plane of polarization.

The above described is an example of the conventional magnetic field measuring apparatus, in which the pressure and electric field can be measured by using a photoelastic element and a Pockels element in place of the magnetic optical element 5 in the same construction.

Since the conventional optical measuring apparatus have the above described construction, it is necessary to use a plurality of transmission paths (optical fibers 9a, 9b) between the analyzer 7 and the photo-detectors, whereby the problem has occurred in that a difference in optical loss and a fluctuation in optical loss between a plurality of transmission paths lead to errors of measurement and the like.

SUMMARY OF THE INVENTION

The present invention was achieved in view of the above described circumstances. According to an apparatus of the present invention, shielding means, made from a material permeable to a light having a first wave length and shielding a light having a second wave length, for changing a shielding ratio of the light having the second wave length in correspondence to a physical quantity to be measured is arranged in transmission paths through which these two kinds of lights having different wave lengths are transmitted, the lights having the first—and second wave lengths being radiated from two light sources and transmitted through the transmission paths, the lights having two kinds of wave length, which passed through the shielding means, being received by the photo-detectors, and a ratio of the quantities of the received lights being operated to determine the physical quantity. Accordingly, it is a first object of the present invention to provide an optical measuring apparatus which can accurately measure a physical quantity without producing a difference in optical loss and a fluctuation in optical loss incidental to the case, where a plurality of transmission path are used, by using a single transmission path from a light source to a photo-detector.

It is a second object of the present invention to provide an optical measuring apparatus which can accurately measure a physical quantity by providing with means for determining a ratio of a light having the first wave length, which was transmitted through the transmission path, to a light having the second wave length, which was transmitted through the transmission path, in quantity even though there is a difference between light sources in quantity of light.

It is a third object of the present invention to provide an optical measuring apparatus which can accurately measure a physical quantity by determining a ratio of a light having the first wave length, which was radiated from the light source, to a light having the second wave length, which was radiated from the light source, in quantity, then dividing the ratio of a light having the first wave length, which was transmitted through the transmission path, to a light having the second wave length, which was transmitted through the transmission path, in quantity by the ratio of a light having the first wave length, which was radiated from the light source, to a light having the second wave length, which was radiated from the light source, in quantity even though the light sources are fluctuated in quantity of light.

It is a fourth object of the present invention to provide an optical measuring apparatus which can accurately measure an output of the light having the first wave length and the second wave length by subtracting a dark current of the photo-detector in the case where the light source is put out from an output of the photo-detector in the case where the light source is switched on.

It is a fifth object of the present invention to provide an optical measuring apparatus which can measure the ratio in quantity of light by an analog circuit without being influenced by the dark current of the photo-detector by radiating both the light having the first wave length and the light having the second wave length in the form of modulated light and separating the transmitted lights by means of a filter.

It is a sixth object of the present invention to provide an optical measuring apparatus which is not influenced by a temperature-change by using a semiconductor having excellent absorption edge wave-length characteristics as the shielding means.

The above and further objects and features of the invention will more fully be apparent from the following detailed description with accompanying drawings.

DETAILED DESCRIPTION OF THE PREFERRED EMBODIMENTS

Figure 1:
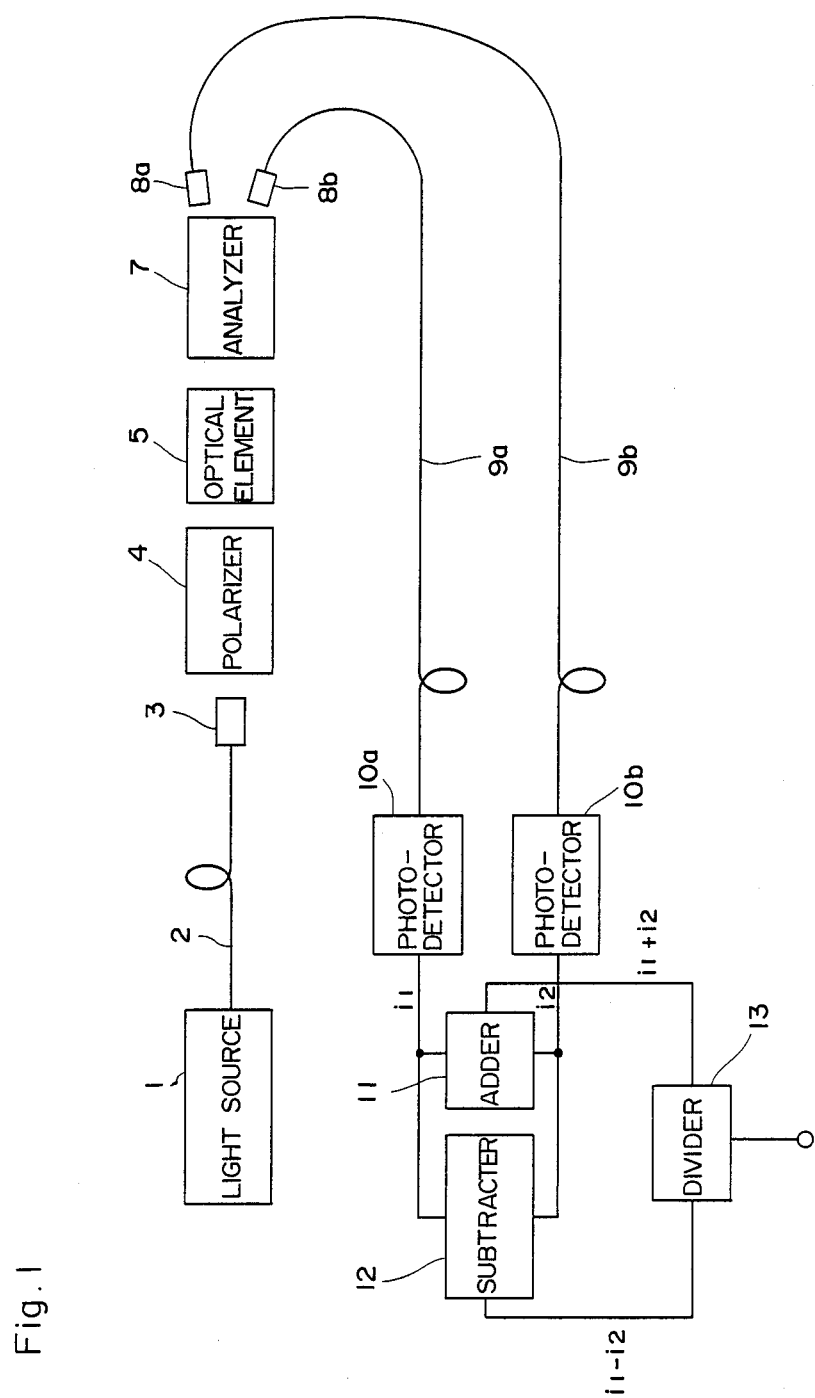
FIG. 1 is a block diagram showing the conventional optical measuring apparatus.
Figure 2:
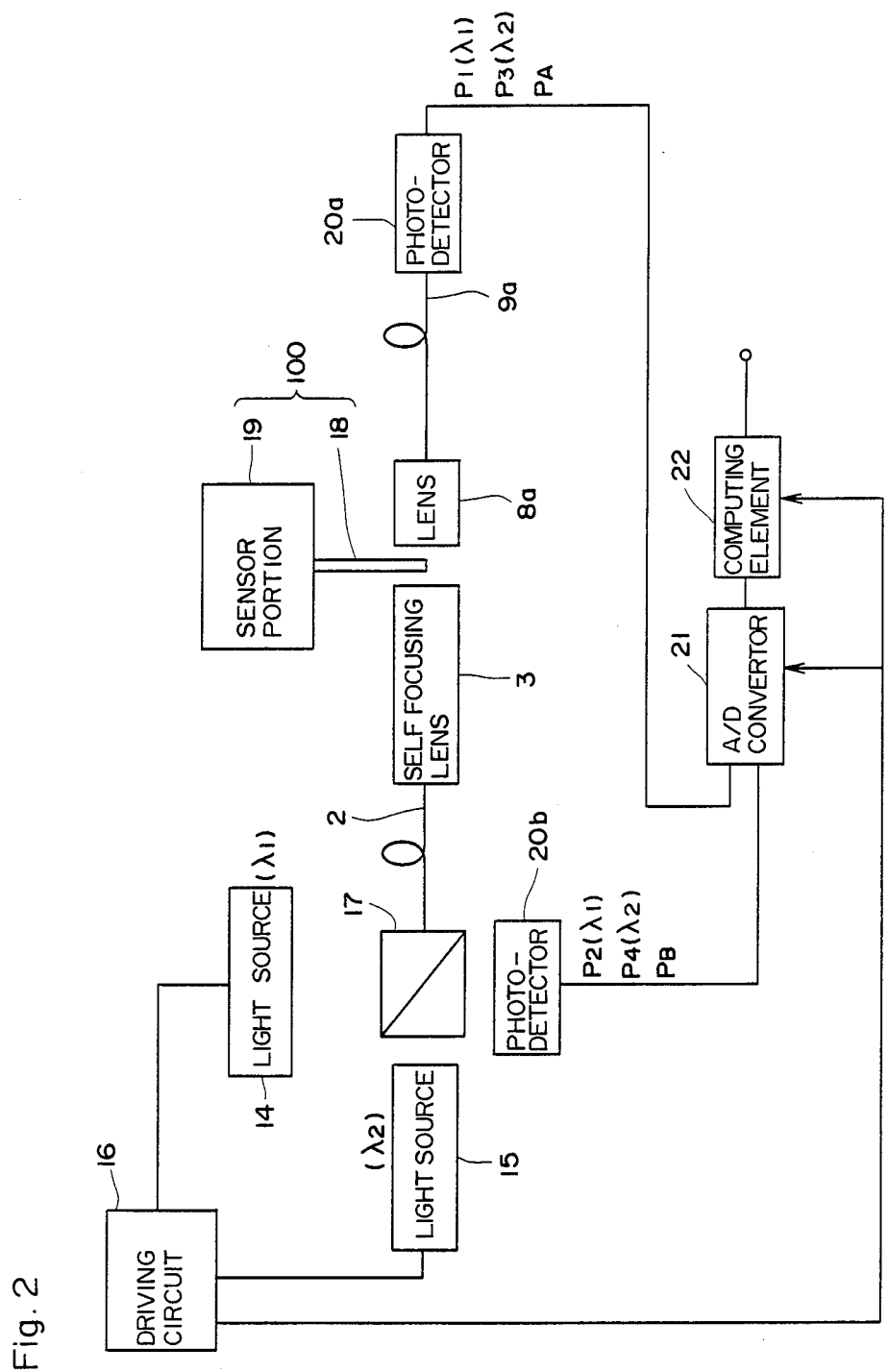
FIG. 2 is a block diagram showing a first preferred embodiment of an optical measuring apparatus according to the present invention.

Referring now to FIG. 2 which is a block diagram showing a first preferred embodiment of an optical measuring apparatus according to the present invention, reference numeral 14, 15 designates a light source for radiating a light having a wave length of $\lambda_1$ and a light having a wave length of $\lambda_2$, respectively, said light sources 14, 15 being alternately switched on by means of a driving circuit 16. The light-source planes of the light sources 14, 15 face to a beam splitter 17, an end plane of a single optical fiber 2 for transmitting lights from the light sources 14, 15 facing to said beam splitter 17, and the optical fiber 2 being provided with a self focusing lens 3 at an end thereof for changing the lights radiated from the light sources 14, 15 to parallel beams of light. In addition, an optical fiber 9a is connected with a lens 8a arranged opposite to the shelf focusing lens 3. A semiconductor 18 having a property being permeable to only the light having a wave length of $\lambda_1$ is arranged in a space between the self focusing lens 3 and the lens 8a so as to usually shield the parallel beams of light passing through said space, a sensor portion 19 for shifting the semiconductor 18 in reply to a physical quantity, being connected with the semiconductor 18. In short, the semiconductor 18 is adapted to shift in the direction vertical to an optical path of the parallel beams of light by the action of the sensor portion 19 and is retreated from a part of the optical path of the parallel beams of light in correspondence to the shift. Shielding means 100 is composed of said semiconductor 18 and said sensor portion 19.

The optical fiber 9a is connected with a photo-detector 20a which receives a light having a wave length of $\lambda_1$ which passed through the semiconductor 18 or passed by the semiconductor 18 without being incident upon the semiconductor 18, and a light having a wave length of $\lambda_2$, which passed by the semiconductor 18 without being shielded with the shift of the semiconductor 18, to convert them into electric signals. A photo-detector 20b faces to the beam splitter 17 and receives lights radiated from the light sources 14, 15 to convert them into electric signals. The photo-detectors 20a, 20b are connected with an A/D convertor 21 to convert output signals of the photo-detectors 20a, 20b into digital values. In addition, the A/D convertor 21 is connected with a computing element 22 for operating a physical quantity on the basis of the converted outputs therefrom.

Besides, a signal, which synchronized with a driving signal for switching on the light sources 14, 15, is sent to the A/D convertor 21 and the computing element 22, respectively, from the driving circuit 16, the A/D convertor 21 digitalizing an input value in synchronization with the synchronizing signal from the driving circuit 16, and the computing element 22 similarly specifying an input signal in synchronization with the driving circuit 16.

Figure 3:
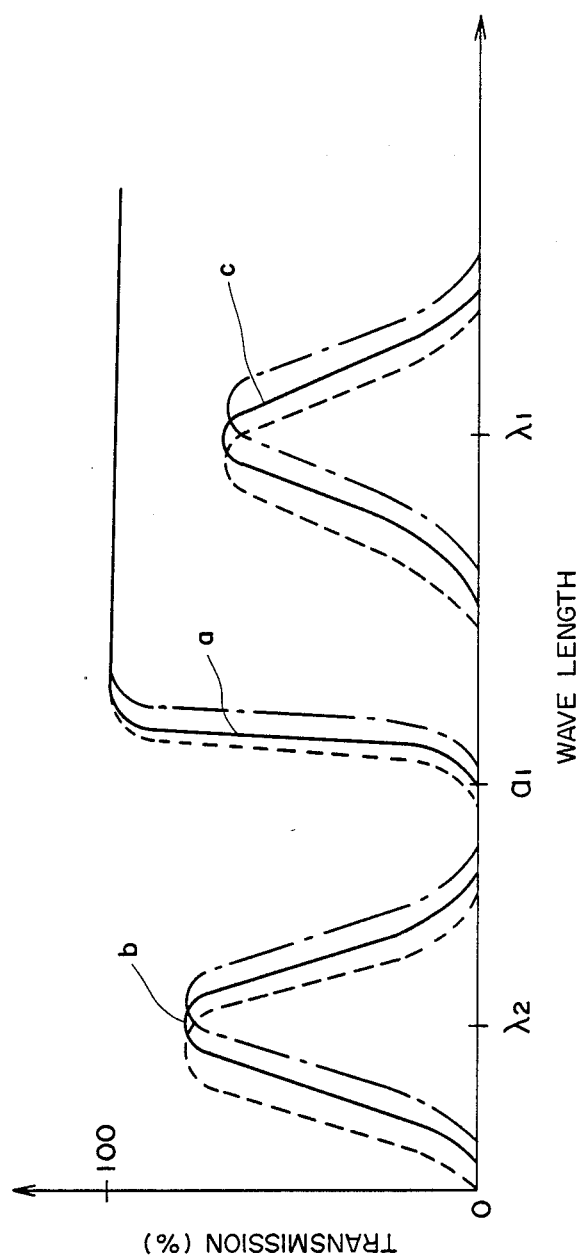
FIG. 3 is a characteristic diagram showing a relation between absorption edge wave-length characteristics of a semiconductor and spectral characteristic of a light source for the description of an operation of an optical measuring apparatus according to the present invention.

Next, the operation is described. The lights having a wave length of $\lambda_1$ and $\lambda_2$ radiated from the light sources 14, 15, which are alternately switched on by means of the driving circuit 16, are incident upon the optical fiber 2 through the beam splitter 17 and a part of them is incident upon the photo-detector 20b. The light incident upon the optical fiber 2 is changed to parallel beams of light by the self focusing lens 3 and the parallel beams of light are incident upon a gap portion where the semiconductor 18 is positioned. The semiconductor 18 has steep absorption edge wave-length characteristics such as a spectral wave form as shown in FIG. 3, that is to say the semiconductor 18 is impermeable to a light having the wave length $\lambda_2$ as shown by a spectral wave form b being shorter than an absorption edge wave length but almost completely permeable to a light having the wave length of $\lambda_1$ as shown by a spectral wave form c being longer than the absorption edge wave length. Accordingly, of the quantity of light incident upon the lens 8a, the quantity of the light having the wave lengths of $\lambda_1$ is constant regardless of the shift of the semiconductor 18 but the quantity of the light having the wave length of $\lambda_2$ is dependent upon the shift of the semiconductor 18.

The light, which passes through the gap portion where the semiconductor 18 is positioned and is connected by the lens 8a, is incident upon the photo-detector 20a through the optical fiber 9a. The photo-detectors 20a, 20b convert the incident light into an electric quantity and put outputs therefrom in the A/D convertor 21. The A/D convertor 21 converts the input into a digital value in synchronization with the switching-on of the light sources 14, 15. In this time, also the outputs of the photo-detectors 20a, 20b in the case where both the light source 14 and the light source 15 are switched off are converted into digital values. The computing element 22 receives an output $P_1$ (the photo-detector 20a) and an output $P_2$ (the photo-detector 20b) in synchronization with the switching-on of the light source 14 (wave length of $\lambda_1$), an output $P_3$(the photo-detector 20a) and an output $P_4$(the photo-detector 20b) in synchronization with the switching-on of the light source 15 (wave length of $\lambda_2$), and an output $P_A$(the photo-detector 20a) and an output $P_B$(the photo-detector 20b) when switched off, to operate $\{(P_3-P_A)/(P_1-P_A)\}/\{(P_4-P_B)/(P_2-P_B)\}$, whereby measuring a quantity of shift of the semiconductor 18, in short the physical quantity, on the basis of a relation among the operated value, the previously set quantity of shift of the semiconductor 18 and the physical quantity.

Here $P_1-P_A$, $P_3-P_A$, $P_2-P_B$ and $P_4-P_B$ show true outputs of the lights having a wave length of $\lambda_1$ and $\lambda_2$ from the photo-detectors 20a, 20b. An influence by a dark current of the photo-detectors is eliminated. In addition, $(P_3-P_A)/(P_1-P_A)$ in said operated value shows a ratio of a quantity of the light having a wave length of $\lambda_2$, which passed by the semiconductor 18, to a quantity of the light having a wave length of $\lambda_1$, which passed through or by the semiconductor 18, in short the quantity of shift of the semiconductor 18 (the physical quantity to be measured). On the other hand, $(P_4-P_B)/(P_2-P_B)$ shows a ratio of a quantity of light radiated from the light source 15 to a quantity of light radiated from the light source 14. Accordingly, since a quotient of a value of the ratio of a quantity of the light having a wave length of $\lambda_2$, which passed by the semiconductor 18, to a quantity of the light having a wave length of $\lambda_1$, which passed through or by the semiconductor 18, by a value of the ratio of a quantity of light radiated from the light source 15 to a quantity of light radiated from the light source 14 is determined, an exact quantity of shift of the semiconductor 18 can be obtained even though the light sources 14, 15 show any fluctuation.

In addition, although a wave length spectrum of the semiconductor 18 and that of the light sources 14, 15 each fluctuates in a range between a broken line and a dotted chain line shown in FIG. 3 in dependence upon a change in circumferential temperature of the semiconductor 18 and the light sources 14, 15, they are not influenced by a temperature change if the spectral wave form a of the absorption edge wave length does not cross the spectral wave forms b, c of the lights having a wave length of $\lambda_1$, $\lambda_2$ radiated from the light sources 14, 15. Therefore, the light sources 14, 15, which radiate lights each having a wave length quite different from the spectral wave length of the absorption edge wave length of the semiconductor 18, are preferably used.

Furthermore, although also an amorphous semiconductor can be used as the semiconductor 18, a crystalline semiconductor is preferably used in view of the achievement of more excellent absorption edge wavelength characteristics.

Besides, any material capable of shifting the semiconductor 18 is correspondence to a physical quantity (such as pressure, magnetic field and electric field) may be used as the sensor portion 19.

Figure 4:
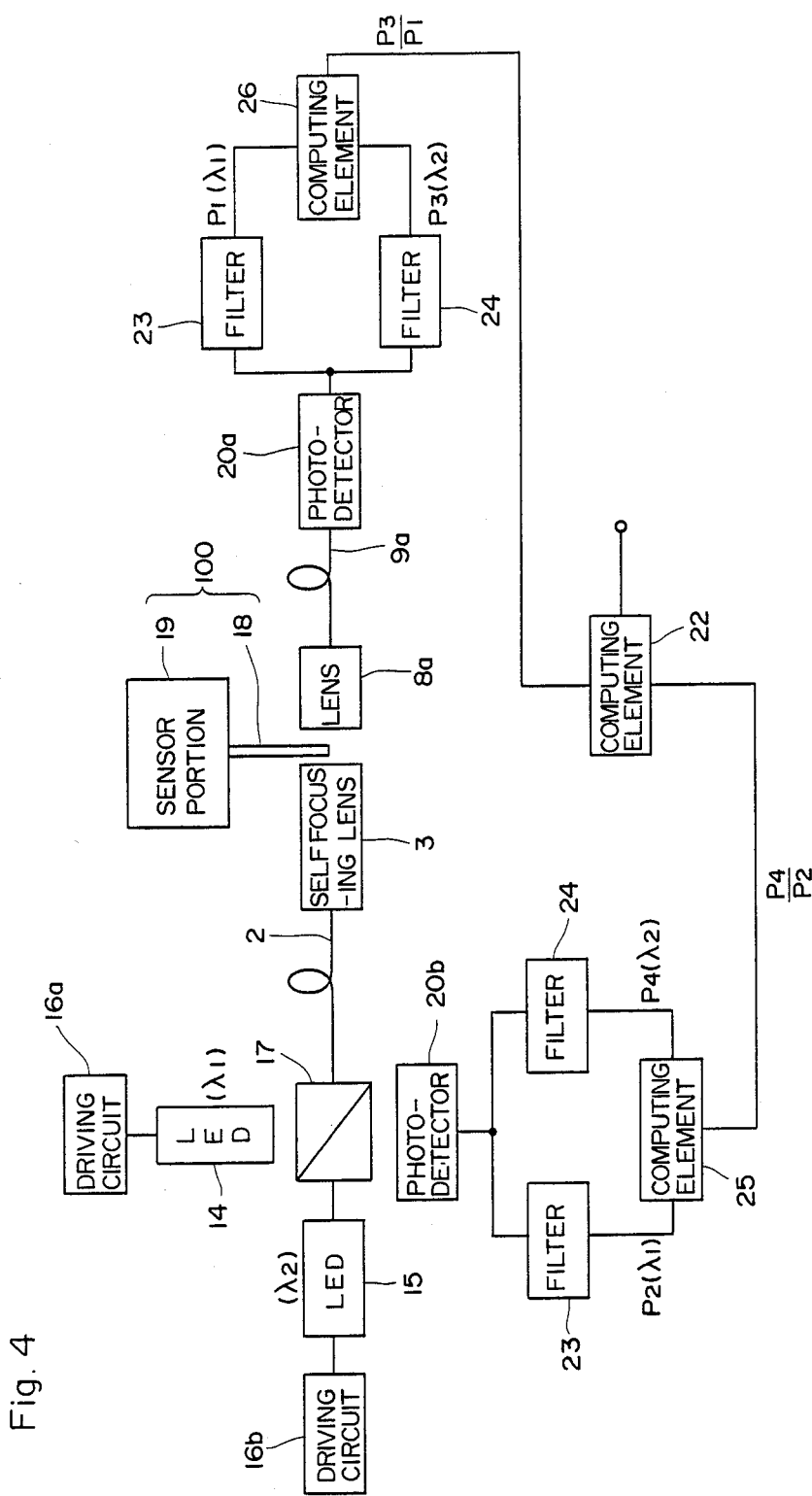
FIG. 4 is a block diagram showing a second preferred embodiment of an optical measuring apparatus according to the present invention.

Referring to FIG. 4 which is a block diagram showing a second preferred embodiment of the present invention, luminous diodes (shown by LED in the drawing for short) radiating lights having wave lengths different from each other are used as the light sources 14, 15, the light sources 14, 15 being simultaneously switched on by driving circuits 16a, 16b in the form of modulated light having frequencies different from each other. In addition, photo-detectors 20a, 20b are connected with filters 23, 24 which transmit only electric signals corresponding to the different frequencies. Furthermore, 25, 26 designate computing elements for dividing an output from a pair of filters 23, 24 by an output from another pair of filters 23, 24, said computing elements 25, 26 being connected with a computing element 22 for dividing an output from the computing element 26 by an output from the computing element 25 to operate the physical quantity. Besides, in this second preferred embodiment, the treatment can be carried out by analog signals, so that an A/D convertor is not required. Other constructions are similar to those in the first preferred embodiment shown in FIG. 2.

In this second preferred embodiment, the light sources 14, 15 are pulsedly driven by frequencies different from each other, in other words, the driving circuits 16a, 16b, so as to be switched on in the form of modulated light and receive an output from the photo-detectors 20a, 20b through the filters 23, 24, respectively, the filter 23 putting out the outputs ($P_1$, $P_2$) from the light source 14, and the filter 24 putting out the outputs ($P_3$, $P_4$) from the light source 15. And, a division of an output from the filter 24 by an output from the filter 23 is carried out by the computing element 25, 26 for the photo-detector 20a, 20b, respectively, a division of an output from the computing element 26 by an output from the computing element 25 (the output from the computing element 25 is $P_4/P_2$ and the output from the computing element 26 is $P_3/P_1$) being carried out by a computing element 21 to obtain the quotient $(P_3/P_1)/(P_4/P_2)$, whereby the quantity of shift of the semiconductor 18, in short the physical quantity, is measured without being influenced by the loss of the optical transmission path or the fluctuation of the light source.

Since only the signal having the specified frequency passes through the filter in the second preferred embodiment, it is unnecessary to take the outputs $P_A$, $P_B$, which are dark-current ingredients, in the first preferred embodiment into consideration. In addition, the physical quantity can be measured in the form of analog signal as it is.

As this invention may be embodied in several forms without departing from the spirit of essential characteristics thereof, the present invention is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An optical measuring apparatus, comprising shielding means made from a substance, which is permeable to a light having a first wave length and shields a light having a second wave length different from the first wave length, changing a ratio of shielding said light having the second wave length in correspondence to a physical quantity to be measured, said shielding means being comprised of a sensor portion responding to the physical quantity and shifting means being connected with the sensor portion and changing a ratio of shielding said light having the second wave length by shifting in correspondence to a responding degree of the sensor portion, said shifting means being a semiconductor, two light sources for radiating said light having the first wave length and said light having the second wave length to be supplied said shielding means through the same one transmission path, a photo-detector for receiving the light having the second wave length, which passed by said shielding means without being shielded, and the light having the first wave length, which passed through or by said shielding means, through the same one transmission path, and a calculating means for calculating a ratio of an optical output corresponding to said light having the second wave length to an optical output corresponding to said light having the first wave length on the basis of an output from said photo-detector to calculate said physical quantity.

2. An optical measuring apparatus as set forth in claim 1, in which said two light sources are alternately driven.

3. An optical measuring apparatus as set forth in claim 2, in which said calculating means subtracts a dark current of the photo-detector from the output from the photo-detector, when the light sources have been driven, to calculate the ratio of the optical output corresponding to the light having the second wave length to the optical output corresponding to the light having the first wave length.

4. An optical measuring apparatus as set forth in claim 1, in which the light having the first wave length and the light having the second wave length are radiated from said two light sources in the form of modulated light having different frequencies and the output from the photo-detector receiving the radiated lights is divided by a filter to calculate the ratio of the optical output corresponding to the light having the second wave length to the optical output corresponding to the light having the first wave length.

5. An optical measuring apparatus as set forth in claim 1, in which said shifting means is shifted in the direction vertical to the transmission path.

6. An optical measuring apparatus as set forth in claim 1, in which said semiconductor is crystalline.

7. An optical measuring apparatus as set forth in claim 1, in which said semiconductor is amorphous.

8. An optical measuring apparatus, comprising shielding means made from a substance, which is permeable to a light having a first wave length and shields a light having a second wave length different from the first wave length, changing a ratio of shielding said light having the second wave length in correspondence to a physical quantity to be measured, two light sources for radiating said light having the first wave length and said light having the second wave length to be supplied to said shielding means through the same one transmission path, a first photo-detector for receiving the light having the second wave length, which passed by said shielding means without being shielded by said shielding means, and the light having the first wave length, which passed through or by said shielding means, through the same one transmission path, a second photo-detector for receiving the light having the first wave length and the light having the second wave length radiated from two light sources, and a calculating means for calculating a quotient of the value of the ratio of the optical output corresponding to the light having the second wave length to an optical output corresponding to the light having the first wave length in the second photo-detector by the value of the ratio of the optical output corresponding to the light having the second wave length to the optical output corresponding to the light having the first wave length in the first photo-detector.

9. An optical measuring apparatus as set forth in claim 8, in which said two light sources are alternately driven.

10. An optical measuring apparatus as set forth in claim 9, in which said calculating means subtracts a dark current of the first and second photo-detectors from the output from the first and second photo-detectors when the light sources have been driven, to calculate the quotient of the value of the ratio of the optical output corresponding to the light having the second wave length to the optical output corresponding to the light having the first wave length in the second photo-detector by the value of the ratio of the optical output corresponding to the light having the second wave length to the optical output corresponding to the light having the first wave length in the first photo-detector.

11. An optical measuring apparatus as set forth in claim 8, in which the light having the first wave length and the light having the second wave length are radiated from said two light sources in the form of modulated light having different frequencies and the output from the first and second photo-detectors receiving the radiated lights is divided by a filter to calculate the quotient of the value of the ratio of the optical output corresponding to the light having the second wave length to the optical output corresponding to the light having the first wave length in the second photo-detector by the value of the ratio of the optical output corresponding to the light having the second wave length to the optical output corresponding to the light having the first wave length in the first photo-detector.

12. An optical measuring apparatus as set forth in claim 8, in which said shielding means is comprised of a sensor portion responding to the physical quantity and shifting means being connected with the sensor portion and changing a ratio of shielding said light having the second wave length by shifting in correspondence to a responding degree of the sensor portion.

13. An optical measuring apparatus as set forth in claim 12, in which said shifting means is shifted in the direction vertical to the transmission path.

14. An optical measuring apparatus as set forth in claim 12, in which said shifting means is a semiconductor.

15. An optical measuring apparatus as set forth in claim 14, in which said semiconductor is crystalline.

16. An optical measuring apparatus as set forth in claim 14, in which said semiconductor is amorphous.

17. An optical measuring apparatus, comprising shielding means made from a substance, which is permeable to a light having a first wave length and shields a light having a second wave length different from the first wave length, changing a ratio of shielding said light having the second wave length in correspondence to a physical quantity to be measured, two light sources for radiating said light having the first wave length and said light having the second wave length to be supplied said shielding means through the same one transmission path, said two light sources being alternately driven, a photo-detector for receiving the light having the second wave length, which passed by said shielding means without being shielded, and the light having the first wave length, which passed through or by said shielding means, through the same one transmission path, and a calculating means for calculating a ratio of an optical output corresponding to said light having the second wave length to an optical output corresponding to said light having the first wave length on the basis of an output from said photo-detector to calculate said physical quantity, said calculating means subtracting a dark current of the photo-detector from the output from the photo-detector, when the light sources have been driven, to calculate the ratio of the optical output corresponding to the light having the second wave length to the optical output corresponding to the light having the first wave length.

* * * * *